United States Patent [19]

Kawakami

[11] Patent Number: 4,885,588
[45] Date of Patent: Dec. 5, 1989

[54] RADAR TRANSPONDER

[75] Inventor: Youichi Kawakami, Hyogo, Japan

[73] Assignee: Mitsubishi Denki Kabushiki Kaisha, Tokyo, Japan

[21] Appl. No.: 247,396

[22] Filed: Sep. 21, 1988

[30] Foreign Application Priority Data

Sep. 22, 1987 [JP] Japan ............................ 62-236152

[51] Int. Cl.⁴ .................................... G01S 13/80
[52] U.S. Cl. ................................ 342/51; 342/46
[58] Field of Search ............... 342/51, 30, 42, 44, 342/45, 46

[56] References Cited

U.S. PATENT DOCUMENTS

| | | | |
|---|---|---|---|
| 3,754,251 | 8/1973 | Thornberg et al. | 342/51 |
| 4,023,167 | 5/1977 | Wahlstrom | 342/51 |
| 4,180,815 | 12/1979 | Hill | 342/51 |
| 4,213,129 | 7/1980 | Kennedy et al. | 342/51 |
| 4,350,982 | 9/1982 | Alpers | 342/51 |
| 4,358,763 | 11/1982 | Strauch | 455/7 X |
| 4,641,374 | 2/1987 | Oyama | 455/603 |
| 4,694,297 | 9/1987 | Sewards | 342/51 |

Primary Examiner—Thomas H. Tarcza
Assistant Examiner—John B. Sotomayor
Attorney, Agent, or Firm—Bernard, Rothwell & Brown

[57] ABSTRACT

A radar transponder comprising:
a control circuit for controlling transmission and reception of signals in order to receive a receiving signal and transmit a definite answer signal,
a video amplifier for amplifying the detection signal of the receiving signal, and
an auxiliary video amplifier for amplifying the amplified output signal up to the level allowing the control circuit to be triggered,
the radar transponder providing
a video switch between the amplifier and auxiliary amplifier and switched in such a manner that a signal input to the auxiliary amplifier is broken only during the transmitting period of the answer signal by feeding back a positive potential pulse synchronized with the output signal from the control circuit and an input signal applied to the auxiliary amplifier is conducted except during the transmitting period of the answer signal, thereby delivering an output signal of the video amplifer to the auxiliary amplifier, and
further, on respect, a pulse stretcher circuit between the control circuit and video switch for slowing the speed of switching over from a high level to a low level of the positive potential pulse in order to remove high frequency components generated on switching the video switch.

3 Claims, 4 Drawing Sheets

RADAR TRANSPONDER

BACKGROUND OF THE INVENTION

1. Field of the Invention

This invention relates to a transponder which sends back a signal automatically upon reception of a signal from the outside, and in detail, to a radar transponder having characteristics that its lowest effective receiver sensitivity is below −50 dB and its effective isotropic radiation power is over +26 dBm.

2. Description of the Prior Art

In general, there has been used a radar transponder which has been installed, for example, at a port of a harbor, on a sea where many rocks are present, or at the top of a mountain difficult to approach to send out an answer signal automatically in response to a signal sent from a remote control office.

FIG. 1 is a block diagram showing a conventional search and rescue radar transponder. In FIG. 1, numeral 1 is a receiving antenna, numeral 2 is a Field Effect Transistor (FET) amplifier connected to the receiving antenna 1, numeral 3 is a diode direct detector connected to the FET amplifier 2, numeral 4 is a video amplifier connected to the diode direct detector 3, numeral 5 is an auxiliary video amplifier connected to the video amplifier 4, numeral 6 is a control circuit connected to the auxiliary video amplifier 5, numeral 7 is a transmitting gate circuit connected to the control circuit 6, numeral 8 is a sweep signal generator connected to the transmitting gate circuit 7, numeral 9 is a microwave oscillator connected to the sweep signal generator 8 and the transmitting gate circuit 7, numeral 10 is a transmitting antenna connected to the microwave oscillator 9, and numeral 11 is a receiving on-off switch which is connected to the transmitting gate circuit 7 and outputs a signal to the FET amplifier 2.

Next, the operation will be described. A signal which is sent from a search radar and received by the receiving antenna is amplified in the FET amplifier 2 and sent to the diode direct detector 3. The detected output from the diode direct detector 3 is amplified to 60 dB or so by the video amplifier 4 and further, amplified by the auxiliary video amplifier 5 up to a level necessary for triggering the control circuit 6. When the control circuit 6 is triggered by the output of the auxiliary video amplifier 5, it generates a pulse for producing a transmitting time of the radar transponder and supplies the pulse to the transmitting gate circuit 7.

The transmitting gate circuit 7 produces a transmitting gate pulse based on the pulse supplied from the control circuit 6 and sends out the transmitting gate pulse to the sweep signal generator 8, the microwave oscillator 9, and the receiving on-off switch 11. The sweep signal generator 8 produces a required number of saw-tooth wave signals using the transmitting gate pulse from the transmitting gate circuit 7 and supplies them to the microwave oscillator 9. The microwave oscillator 9 makes a microwave oscillation in a certain time interval by means of the transmitting gate pulse from the transmitting gate circuit 7. The oscillation frequency is varied in accordance with the voltage value of the saw-tooth wave signal from the sweep signal generator 8 within the rated frequency range for frequency sweeping. The transmitting output which is supplied from the microwave oscillator 9 and frequency-modulated therein is radiated through the transmitting antenna 10 to space.

When the receiving on-off switch 11 is applied with the transmitting gate pulse from the transmitting gate circuit 7, it stops the operation of the FET amplifier 2 only during the period corresponding to the width of the receiving gate pulse by making the output level supplied to the FET amplifier 2 zero. This attenuates the input applied to the diode direct detector 3 and further attenuates the inputs applied to the video amplifier 4 and the auxiliary video amplifier 5. Thus, the radar transponder is made so as not to suffer influences due to its own transmitting power.

A conventional search and rescue radar transponder is constituted as described above. Accordingly, only during the transmitting period, the operation of the FET amplifier 2 is stopped and the input to the video amplifier 4 is attenuated. But, since the input can not be broken completely, although a transmitting output fed back to the receiving antenna 1 during the transmitting period is attenuated by stop of the operation of the FET amplifier 2, the transmitting output is amplified to 60 dB or so by the video amplifier 4, and an input signal having a substantially fairly high level is input to the auxiliary video amplifier 5. There has been a problem that owing to the influence of the above process, the video amplifier 5 can not operate normally for a long time, and the transponder can not receive signals from search radars even after the transmission is stopped.

SUMMARY OF THE INVENTION

The main object of this invention is to obtain a radar transponder which returns to normal operating conditions immediately after its transmission has stopped, and comes into a state enabling reception of signals from search radars.

The secondary object of this invention is to obtain a radar transponder which does not radiate unnecessary electric waves at the instant when a video switch provided in order to achieve the main object switches over to a closed state from an open state.

In order to achieve this main object of the invention, a radar transponder related to this invention has a video switch which is opened and closed by an output signal from a control circuit and disposed between a video amplifier and an auxiliary video amplifier.

In order to achieve the secondary object of this invention, a radar transponder has a pulse stretcher circuit disposed between the video switch opened and closed by an output signal from the control circuit, and the control circuit.

DETAILED DESCRIPTION OF THE PREFERRED EMBODIMENT

Hereinafter some of suitable embodiments of radar transponders related to this invention will be described with reference to attached drawings.

Figure 1:
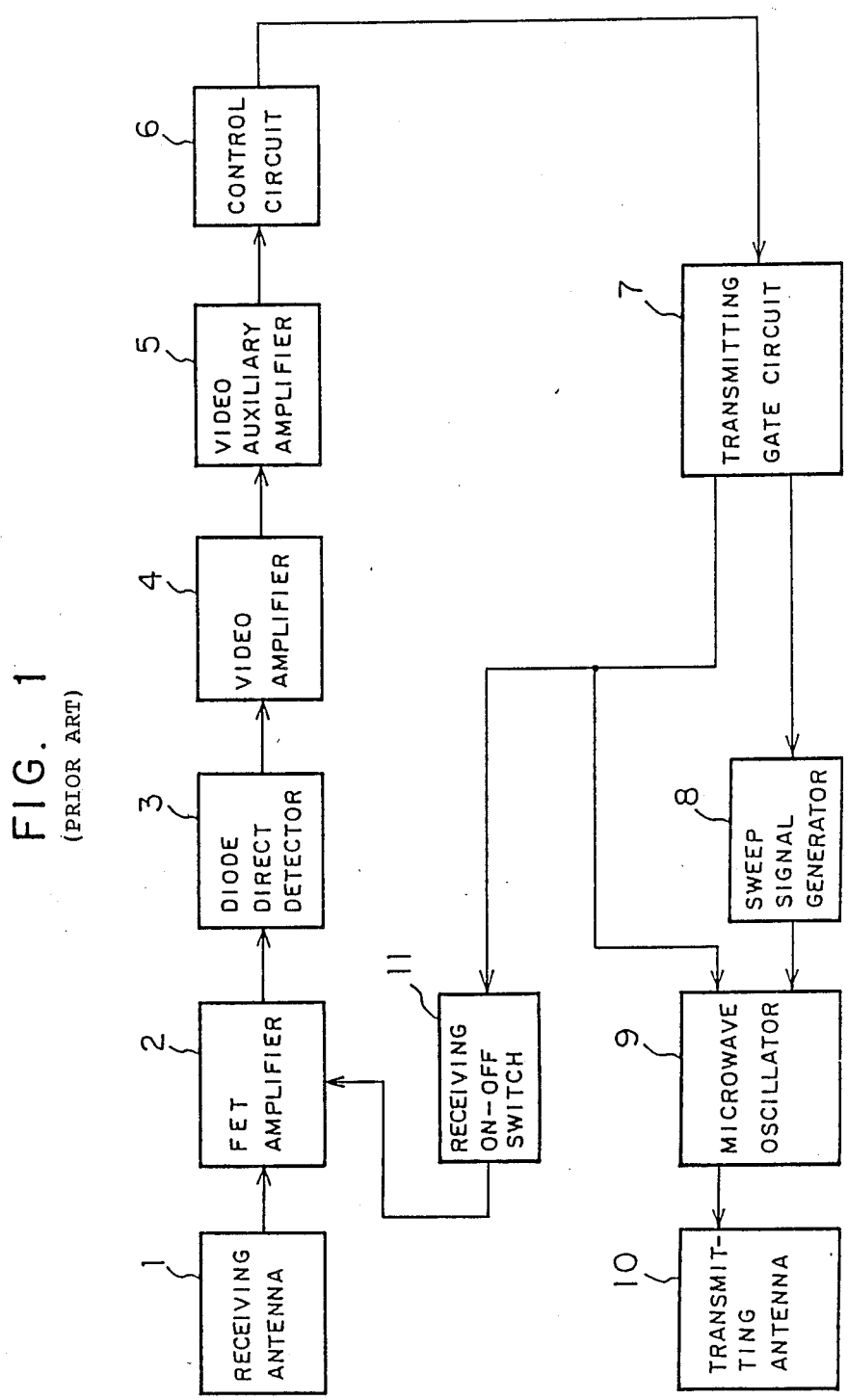
FIG. 1 is a block diagram showing a conventional search and rescue radar transponder.
Figure 2:
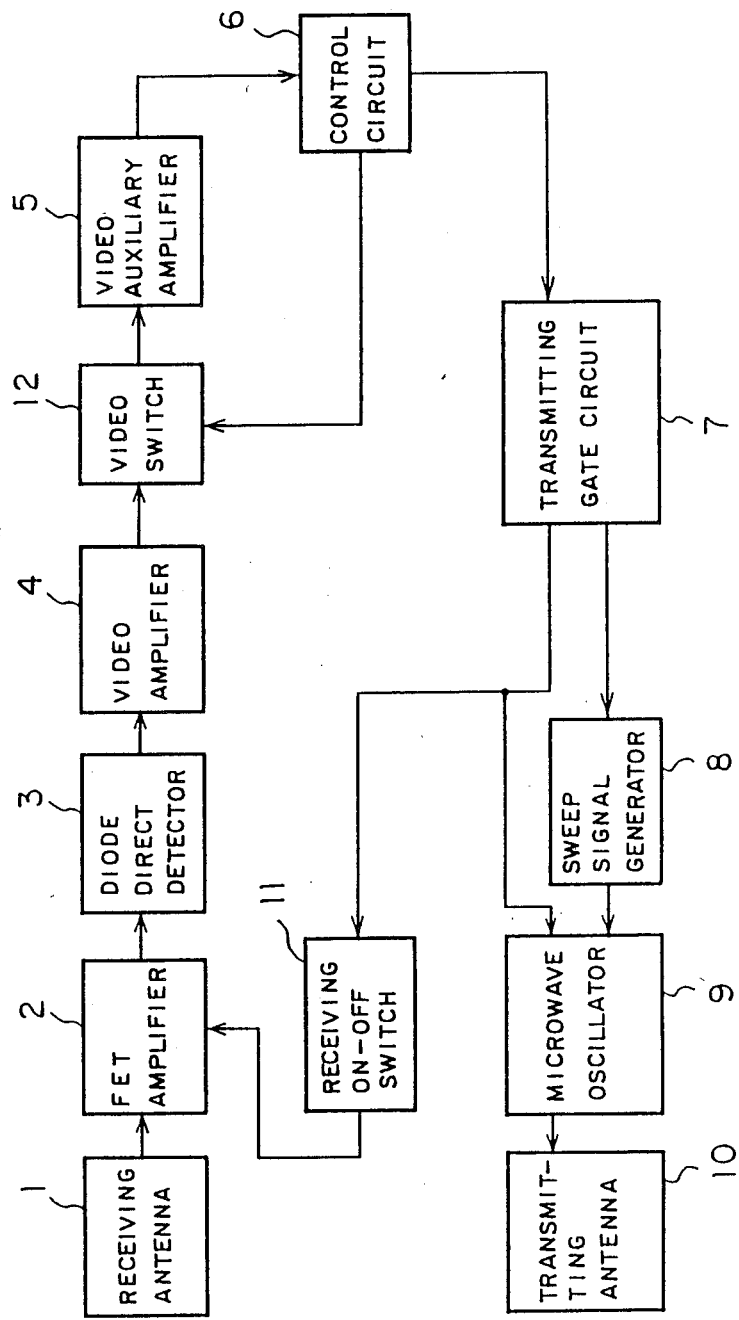
FIG. 2 is a block diagram showing a search and rescue radar transponder according to a first embodiment of this invention.

In FIG. 2, a block diagram of a search and rescue radar transponder related to the first embodiment according to this invention is illustrated. In the figure, numeral 1 is a receiving antenna, numeral 2 is a FET amplifier connected to the receiving antenna 1, numeral 3 is a diode direct detector connected to the FET amplifier 2, numeral 4 is a video amplifier connected to the diode direct detector 3, numeral 12 is a video switch which is connected to the video amplifier 4 and of which opening and closing are controlled by an output signal from a control circuit described later, numeral 5 is an auxiliary video amplifier connected to the video switch 12, numeral 6 is a control circuit connected to the auxiliary video amplifier 5, numeral 7 is a transmitting gate circuit connected to the control circuit 6, numeral 8 is a sweep signal generator connected to the transmitting gate circuit 7, numeral 9 is a microwave oscillator connected to the sweep signal generator 8 and the transmitting gate circuit 7, numeral 10 is a transmitting antenna connected to the microwave oscillator 9, and numeral 11 is a receiving on-off switch which is connected to the transmitting gate circuit 7 and outputs a signal to the FET amplifier 2.

Next, the operation will be described. A signal received by the receiving antenna 1 and sent from a search radar is amplified by the FET amplifier 2 and sent to the diode direct detector 3. The detected output from the diode direct detector 3 is amplified to 60 dB or so by the video amplifier 4, and further it is amplified up to a level necessary for triggering the control circuit 6 by the video amplifier 5 when the video switch 12 is in an open state. When the control circuit 6 is triggered by an output from the auxiliary video amplifier 5, it produces a pulse for generating a transmitting time of the radar transponder for supplying it to the transmitting gate circuit 7. Another positive potential pulse synchronized with the pulse applied to the transmitting gate circuit 7 is input from this control circuit 6 to the video switch 12. When the control circuit 6 is triggered, this positive potential pulse is brought into a high level only during the transmitting period to bring the video switch 12 into a closed state and break the signal which is output from the video amplifier 4 and applied to the auxiliary video amplifier 5. The positive potential pulse is brought into a low level except during the transmitting period to bring the video switch 12 into an open state. Accordingly, the signal output from the video amplifier 4 is input into the auxiliary video amplifier 5 as it is.

The transmitting gate circuit 7 produces a transmitting gate pulse based on the pulse output from the control circuit 6 and sends out it to the sweep signal generator 8, the microwave oscillator 9, and the receiving on-off switch 11. When the receiving on-off switch 11 is applied with the transmitting gate pulse from the transmitting gate circuit 7, it stops the operation of the FET amplifier 2 only during the period corresponding to the width of the receiving gate pulse by making the output level applied to the FET amplifier 2 zero, and attenuates the input applied to the diode direct detector 3, and further the input applied to the video amplifier 4. Here, the attenuated signal is amplified to 60 dB or so by the video amplifier 4 and brought into a fairly high level. But, since the video switch 12 is brought into a closed state at that time, the signal is input to the auxiliary video amplifier 5 by no means.

The sweep signal generator 8 produces a required number of saw-tooth signals using the transmitting gate pulse applied from the transmitting gate circuit 7 and sends out them to the microwave oscillator 9. This microwave oscillator 9 makes a microwave oscillate for a definite time interval by the transmitting gate pulse sent from the transmitting gate circuit 7 and varies the oscillation frequency within the rated frequency range in accordance with the voltage value of the saw-tooth wave signal sent from the sweep signal generator 8 for sweeping the frequency. The transmitting output which is supplied from the microwave oscillator 9 and of which frequency is swept is radiated into space through the transmitting antenna 10.

As described above, during the transmitting period, the FET amplifier 2 stops its operation, and the video switch 12 comes also into a closed state. Immediately after transmission is stopped, the FET amplifier 2 returns to normal operating conditions and the video switch 12 comes into an open state.

Now, there has been the following problem in the first embodiment. That is, since the speed with which the video switch 12 switches over from a closed state to an open state is speedy, high-frequency components are generated at that instant. The control circuit 6 is triggered by the high-frequency components amplified by the auxiliary video amplifier 5, and consequently the microwave oscillator 9 is operated too, thereby radiating unnecessary electric waves.

Figure 3:
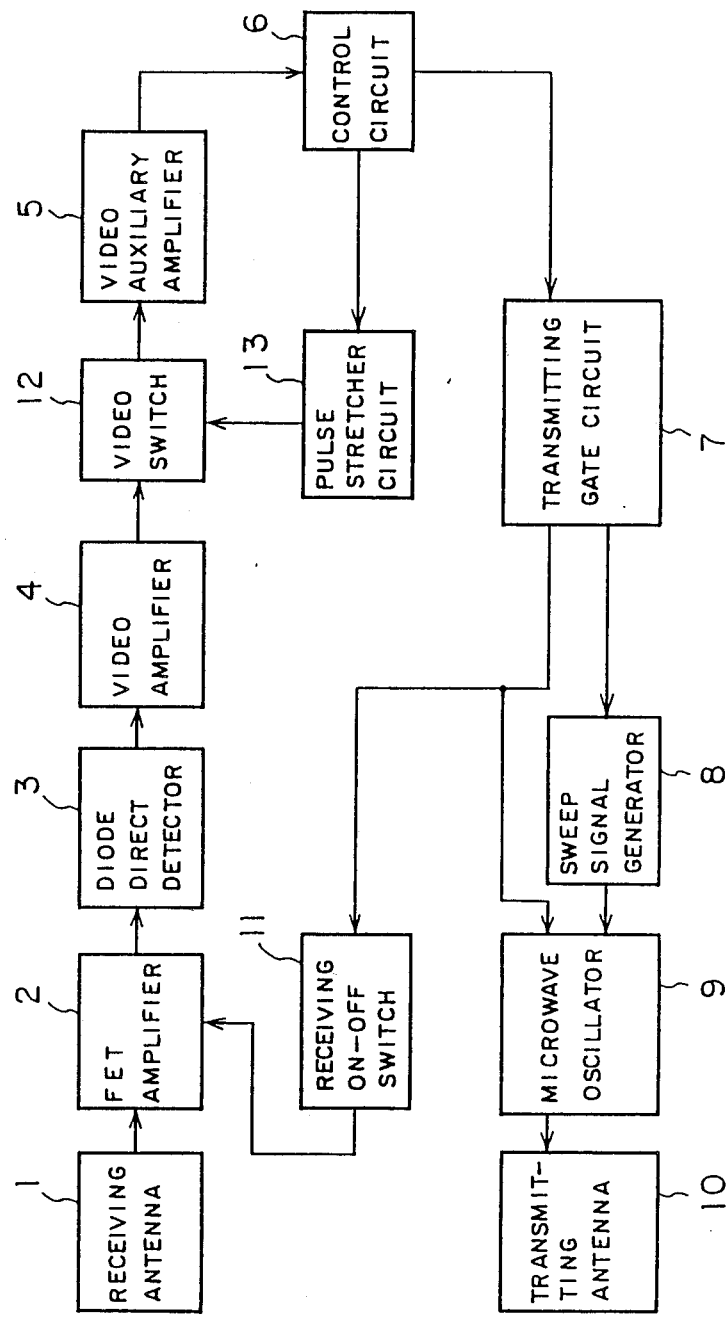
FIG. 3 is a block diagram showing a search and rescue radar transponder according to a second embodiment of this invention.

Then, a second embodiment has been devised as shown in FIG. 3 in order to prevent radiation of unnecessary electric waves.

In FIG. 3, numerals 1, 2, 3, and 4 are a receiving antenna, a FET amplifier, a diode direct detector, and a video amplifier, respectively. Numerals 12, 5, 6, and 7 are a video switch, an auxiliary video amplifier, a control circuit, and a transmitting gate circuit, respectively. Numerals 8, 9, 10, and 11 are a sweep signal generator, a microwave oscillator, a transmitting antenna, and a receiving on-off switch.

Numeral 13 is a pulse stretcher circuit which is disposed between the control circuit 6 and the video switch 12 and slows the speed with which the positive voltage pulse output from the control circuit 6 switches from a high level to a low level.

Next, the operation will be described. The signal from a search radar which is received by the receiving antenna 1 is amplified by the FET amplifier 2 and sent to the diode direct detector 3. The detected output from the diode direct detector 3 is amplified to 60 dB or so by the video amplifier, and further amplified by the auxiliary video amplifier 5 up to the level necessary for triggering the control circuit 6 when the video switch 12 is in an open state. When the control circuit 6 is triggered by the output of the auxiliary video amplifier 5, it produces a pulse for making a transmitting time of the radar transponder and outputs it to the gate circuit 7. Another positive voltage pulse synchronized with the pulse applied to the transmitting gate circuit 7 is input to the video switch 12. When this positive voltage pulse is brought into a high level only during the transmitting period when the control circuit 6 is triggered, thereby bringing the video switch 12 into a closed state and breaking the signal output from the video amplifier 4 and applied to the auxiliary video amplifier 5. This positive voltage pulse is brought into a low level except during the transmitting period, thereby bringing the video switch 12 into an open state and, as described previously, supplying the signal output from video amplifier 4 to the auxiliary video amplifier 5 as it is.

At this time, the positive voltage pulse output from the control circuit 6 changes slowly from a high level to a low level by means of the pulse stretcher circuit 13 and is then input to the video switch 12. Accordingly, the video switch 12 which is opened and closed by the output from the pulse stretcher circuit 13 moves slowly from an open state to a closed state, and at that time, unnecessary high frequency components generated from the video switch 12 are suppressed.

The transmitting gate circuit 7 produces a transmitting gate pulse based on the pulse output from the control circuit 6 and sends it to the sweep signal generator 8, a microwave oscillator 9, and the receiving on-off switch 11. When the receiving on-off switch 11 is applied with the transmitting gate pulse from the transmitting gate circuit 7, it makes zero the output applied to the FET amplifier 2, stops the operation of the FET amplifier 2 during the period corresponding to the width of the transmitting gate pulse, and attenuates the input applied to the diode direct detector 3 and further the input applied to the video amplifier 4. Here, the attenuated signal is amplified to 60 dB or so by the video amplifier 4 and becomes a signal of a fairly high level. But, since the video switch 12 has come into a closed state at that time as described previously, the signal is input to the auxiliary video amplifier 5 by no means. The sweep signal generator 8 produces a required number of saw-tooth wave signals using the transmitting pulse from the transmitting gate circuit 7 and then outputs them to the microwave oscillator 9. The microwave oscillator 9 makes a microwave oscillate only during a definite time by the transmitting gate pulse from the transmitting gate circuit 7, and varies the oscillation frequency in accordance with the voltage value of the saw-tooth wave signal applied from the sweep signal generator 8 within the rated frequency range for sweeping the frequency. The transmitting output which is applied from the microwave oscillator 9 and of which frequency is swept is radiated into space through the transmitting antenna 10.

Figure 4:
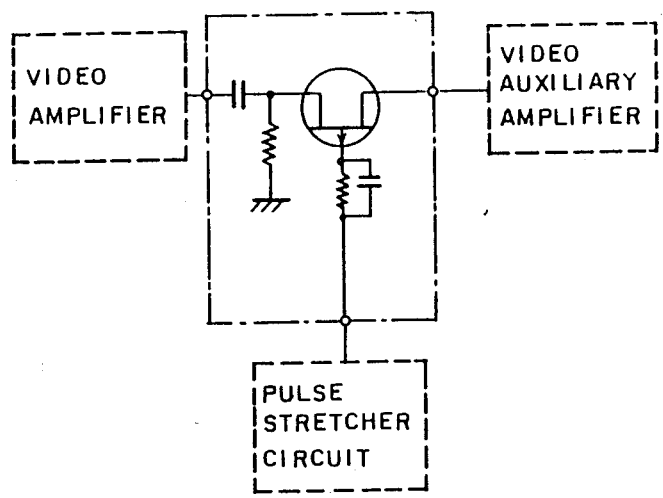
FIG. 4 shows a switching circuit using a P-channel junction-type field effect transistor.
Figure 5:
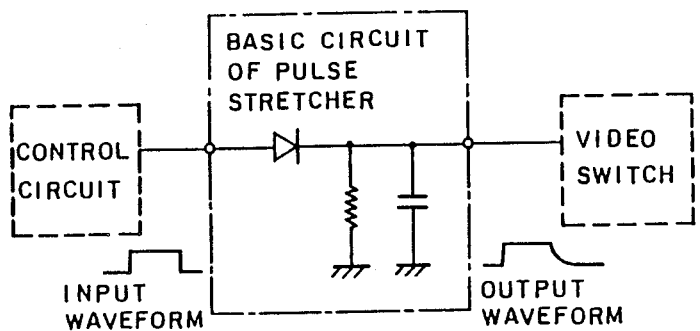
FIG. 5 shows the basic circuit of the pulse stretcher circuit in FIG. 3.

FIG. 4 shows the basic circuit of the video switch in FIG. 2 and FIG. 3. The circuit in FIG. 4 is a switching circuit using a P-channel junction-type field effect transistor and performs ON/OFF operation using the output of the pulse stretcher circuit. FIG. 5 shows the basic circuit of the pulse stretcher circuit in FIG. 3. The circuit in FIG. 5 uses a switching diode to make gentle the trailing edge portion of the pulse applied from the control circuit.

As described above, the FET amplifier 2 is stopped during the transmitting period, and the video switch 12 is also brought into a closed state. Immediately after the transmission is stopped, the FET amplifier 2 returns to normal operating conditions, and the video switch 12 is slowly brought into an open state, and returns without generating unnecessary high frequency components.

A search and rescue radar transponder has been described in the above-mentioned embodiment. But, other radar transponders also take the same effect as the above-mentioned embodiment.

That is, the following apparatus can be concretely enumerated as use of other radar transponders.

(1) Navigational Aid Apparatus

This apparatus is installed as a buoy on sea at dangerous places for navigation of vessels owing to rocks and so forth on a sea route and transmits an answer wave indicating the dangerous places to marine radars upon receiving electric waves from the marine radars.

(2) Position Display Apparatus

This apparatus is employed at a heliport and the like used for departure and arrival of helicopters and displays the accurate position of the heliport on a PPI face of a radar loaded in a helicopter.

The principle of its operation is as follows. When an electric wave is input to the radar transponder concerned from the radar loaded on the helicopter, an answer wave showing the position of the heliport is transmitted to the radar loaded on the helicopter from the transponder. This apparatus performs function equal to that of a search and rescue radar transponder.

As described above, since, according to this invention, the video switch which is opened and closed by the output signal of the control circuit is disposed between the video amplifier and the auxiliary video amplifier, the auxiliary video amplifier is not applied with an input signal of a high level by bringing the video switch into an open state during its own transmitting period. As a result, there is an effect that a radar transponder is obtained, which returns to normal operating conditions immediately after the transmission is stopped and comes into a state enabling reception of signals from search radars.

Since, according to this invention, the pulse stretcher circuit is disposed between the control circuit and the video switch, and the video switch is constituted in such a manner that it switches over slowly from an open state to a closed state, there can be obtained a radar transponder in which generation of high frequency components is suppressed at the time when the state of the video switch is switched over, thereby radiating unnecessary electric waves by no means.

What is claimed is:
1. A radar transponder comprising:
   a video amplifier for amplifying a detected output of a receiving signal up to a definite level;
   an auxiliary video amplifier for amplifying an output amplified by the video amplifier up to the level necessary for triggering a control circuit;
   said control circuit being triggered by an output of the auxiliary video amplifier to generate a pulse for producing a transmitting time of the radar transponder;
   said radar transponder having a video switch provided between said amplifier and said auxiliary amplifier to switch over from a closed state in which a signal applied to said auxiliary amplifier from said amplifier is broken by a positive potential pulse input synchronized with an output signal from said control circuit and brought int a high level only during the transmitting period of the radar transponder to an open state in which the signal applied to said auxiliary amplifier from said amplifier being conducted by said positive pulse is brought into a zero level except during said transmitting period, and vice versa;
   wherein the detected output of said receiving signal is received by a receiving antenna and amplified by a Field Effect Transistor (FET) amplifier, and then detected by a diode direct detector and supplied to said video amplifier and, at the same time, the transmission of the radar transponder is performed by a transmitting gate circuit for producing a transmitting gate pulse based on the output pulse from said control circuit and supplying the transmitting pulse to a receiving on-off switch, a sweep signal generator, and a microwave oscillator, said sweep signal generator for receiving said transmitting gate pulse producing a required number of saw-tooth wave signals using the pulse, and supplying them to said microwave oscillator, said microwave oscillator for making a microwave oscillate only during a finite time interval using said transmitting gate pulse and radiating a transmitting signal through a transmitting antenna while varying the oscillation frequency within the rated frequency range in accordance with the voltage value of said sawtooth wave signal to sweep the frequency, and a receiving on-off switch for making zero an output level of a receiving signal applied to said FET amplifier by said transmitting gate pulse and stopping the operation of said FET amplifier only during the period corresponding to the width of the receiving gate pulse concerned.

2. A radar transponder according to claim 1, wherein a pulse stretcher circuit is provided between said video switch and said control circuit to slow the speed of switching over from a closed state to an open state of said video switch by slowing the speed of switching over from a high level to a low level of the positive potential pulse output from said control circuit.

3. A radar transponder according to claim 2, wherein a receiving signal received through the receiving antenna and input to said video amplifier after being detected is a search signal radiated from a search radar, and a transmitting signal produced by said control signal and radiated into space through the transmitting gate circuit, the sweep signal generator, the microwave oscillator, and the transmitting antenna is a rescue signal.

* * * * *

UNITED STATES PATENT AND TRADEMARK OFFICE
CERTIFICATE OF CORRECTION

PATENT NO. : 4,885,588

DATED : December 5, 1989

INVENTOR(S) : Youichi Kawakami

It is certified that error appears in the above-identified patent and that said Letters Patent is hereby corrected as shown below:

In the Abstract, line 22, "respect" should be --request--.

Signed and Sealed this

Twenty-third Day of October, 1990

*Attest:*

HARRY F. MANBECK, JR.

*Attesting Officer*  *Commissioner of Patents and Trademarks*